US012623862B2

(12) United States Patent
Hystad

(10) Patent No.: US 12,623,862 B2
(45) Date of Patent: May 12, 2026

(54) PUMPING SYSTEM AND METHOD

(71) Applicant: Karmøy Winch AS, Kopervik (NO)

(72) Inventor: Magne Hystad, Kopervik (NO)

(73) Assignee: Karmøy Winch AS, Kopervik (NO)

( * ) Notice: Subject to any disclaimer, the term of this patent is extended or adjusted under 35 U.S.C. 154(b) by 44 days.

(21) Appl. No.: 18/770,328

(22) Filed: Jul. 11, 2024

(65) Prior Publication Data

US 2024/0367923 A1      Nov. 7, 2024

Related U.S. Application Data

(63) Continuation-in-part of application No. 16/497,233, filed as application No. PCT/NO2018/050086 on Mar. 23, 2018, now abandoned.

(30) Foreign Application Priority Data

Mar. 24, 2017    (NO) ................................... 20170485

(51) Int. Cl.
  *A01K 73/02*     (2006.01)
  *B65G 53/30*     (2006.01)
  (Continued)

(52) U.S. Cl.
  CPC .............. B65G 53/30 (2013.01); F04D 7/02 (2013.01); F04D 29/669 (2013.01)

(58) Field of Classification Search
  CPC .......................... A01K 73/02–10; A01K 79/00
  (Continued)

(56) References Cited

U.S. PATENT DOCUMENTS 1,447,553 A * 3/1923 Hudson .................. A01K 73/02
                                                    43/6.5
1,462,196 A * 7/1923 Dros ...................... A01K 79/00
                                                    43/6.5
(Continued)

FOREIGN PATENT DOCUMENTS

AU        2018239113 B2     3/2018
CN        203206990        9/2013
(Continued)

OTHER PUBLICATIONS

Argentina Office Action issued for Argentina Patent Application No. 20180100709, dated Oct. 8, 2021 in 5 pages.
(Continued)

*Primary Examiner* — Joseph A Dillon, Jr.
(74) *Attorney, Agent, or Firm* — Knobbe, Martens, Olson & Bear, LLP

(57) ABSTRACT

A pumping system for moving a liquid, or a mixture of a liquid and one or more objects, from a collector device submerged in a body of water, to a receiving facility includes a first delivery line, a second delivery line and a pump unit. The pump unit is submerged in the body of water at a first depth below the water surface and arranged between the collector and the receiving facility. The first delivery line is fluidly connected between the collector device and a pump unit inlet. The second delivery line is fluidly connected between a pump unit outlet and the receiving facility. The collector device is arranged at a second depth and the first depth and the second depth are controllable independently of each other.

20 Claims, 7 Drawing Sheets

(51) Int. Cl.
    *F04D 7/02*        (2006.01)
    *F04D 29/66*     (2006.01)
(58) Field of Classification Search
    USPC ........................................................ 43/6.5
    See application file for complete search history.

(56)            References Cited

U.S. PATENT DOCUMENTS

| | | | | |
|---|---|---|---|---|
| 2,402,099 | A * | 6/1946 | Toft | A01K 79/00 |
| | | | | 210/348 |
| 3,212,822 | A * | 10/1965 | Payne | A01K 79/00 |
| | | | | 406/115 |
| 3,254,924 | A * | 6/1966 | Milton | A01K 79/00 |
| | | | | 406/105 |
| 3,273,276 | A * | 9/1966 | Sixten | A01K 63/02 |
| | | | | 43/14 |
| 3,398,694 | A * | 8/1968 | Lerch | F04D 29/708 |
| | | | | 415/232 |
| 3,440,752 | A * | 4/1969 | Minter | A01K 73/00 |
| | | | | 43/6.5 |
| 3,783,535 | A * | 1/1974 | Hanks | E02F 3/8875 |
| | | | | 37/316 |
| 3,856,429 | A * | 12/1974 | Pettersson | F04D 9/005 |
| | | | | 417/900 |
| 3,871,332 | A * | 3/1975 | Hayashi | A01K 79/00 |
| | | | | 43/6.5 |
| 4,509,286 | A * | 4/1985 | John | A01K 73/00 |
| | | | | 43/9.1 |
| 4,551,042 | A * | 11/1985 | Hagedorn | B65G 53/30 |
| | | | | 417/174 |
| 4,702,676 | A * | 10/1987 | Westfall | F04F 5/10 |
| | | | | 43/4.5 |
| 5,018,946 | A * | 5/1991 | Breckner | F04F 5/10 |
| | | | | 417/198 |
| 5,071,314 | A * | 12/1991 | Jacobsen | F04D 29/4273 |
| | | | | 415/72 |
| 5,142,808 | A * | 9/1992 | Dupree, Jr. | A01K 69/06 |
| | | | | 119/213 |
| 5,361,528 | A * | 11/1994 | Peacock | A01K 80/00 |
| | | | | 43/6.5 |
| 6,112,699 | A * | 9/2000 | Saxby | A01K 79/00 |
| | | | | 119/213 |
| 6,161,504 | A * | 12/2000 | Jungling | A01K 79/00 |
| | | | | 119/226 |
| 6,343,433 | B1 * | 2/2002 | Granberg | A01K 79/00 |
| | | | | 43/6.5 |
| 7,101,155 | B2 * | 9/2006 | Savidge | F04C 25/02 |
| | | | | 417/302 |
| 7,721,483 | B2 * | 5/2010 | Angell | A01K 79/00 |
| | | | | 43/4.5 |
| 10,041,457 | B2 * | 8/2018 | Male | F02M 59/361 |
| 10,159,230 | B1 * | 12/2018 | Ding | A01K 73/04 |
| 11,091,891 | B1 * | 8/2021 | Kelly | E02B 15/10 |
| 11,382,318 | B2 * | 7/2022 | Roaldsnes | A01K 79/00 |
| 11,470,830 | B1 * | 10/2022 | Bosteels | A01K 73/00 |
| 11,517,002 | B1 * | 12/2022 | Bosteels | A01K 73/00 |
| 11,617,358 | B2 * | 4/2023 | Martin | A01K 81/06 |
| | | | | 43/6 |
| 11,680,562 | B2 * | 6/2023 | Hansmann | F04B 49/22 |
| | | | | 417/279 |
| 11,812,732 | B2 * | 11/2023 | Jin | A01K 79/00 |
| 11,988,213 | B2 * | 5/2024 | De Raeve | F04D 17/12 |
| 12,426,581 | B2 * | 9/2025 | Hystad | B63B 21/66 |
| 2004/0126244 | A1 * | 7/2004 | Savidge | F04C 28/24 |
| | | | | 417/239 |
| 2005/0217732 | A1 * | 10/2005 | Tollner | F04D 19/04 |
| | | | | 137/565.3 |
| 2006/0048436 | A1 * | 3/2006 | Ernsten | A01K 73/063 |
| | | | | 43/6.5 |

| | | | | |
|---|---|---|---|---|
| 2009/0047142 | A1 * | 2/2009 | Hozumi | F04C 25/02 |
| | | | | 417/244 |
| 2010/0139147 | A1 * | 6/2010 | Rokke | A01K 73/05 |
| | | | | 43/4.5 |
| 2015/0272094 | A1 * | 10/2015 | Pearlman | A01K 73/045 |
| | | | | 43/9.1 |
| 2017/0325432 | A1 * | 11/2017 | Halse | A22C 25/08 |
| 2018/0184640 | A1 * | 7/2018 | Miller | A01M 23/02 |
| 2020/0015464 | A1 | 1/2020 | Hystad | |
| 2020/0323183 | A1 * | 10/2020 | Tvedt | A01K 80/00 |
| 2022/0105858 | A1 * | 4/2022 | Staehle | F04D 13/02 |
| 2022/0201975 | A1 * | 6/2022 | Karimi | A01K 11/006 |
| 2023/0287880 | A1 * | 9/2023 | Bagulayan | F04B 49/20 |
| 2024/0367923 | A1 | 11/2024 | Hystad | |

FOREIGN PATENT DOCUMENTS

| | | | | |
|---|---|---|---|---|
| CN | 104285919 | | 1/2015 | |
| CN | 105814276 | | 7/2016 | |
| CN | 105829681 | | 8/2016 | |
| CN | 117397649 | A * | 1/2024 | ............ B63B 35/16 |
| EP | 0073769 | | 3/1983 | |
| EP | 3599845 | B1 | 11/2024 | |
| FR | 1399321 | | 5/1965 | |
| GB | 125370 | | 4/1920 | |
| GB | 976520 | | 11/1964 | |
| GB | 1172179 | | 11/1969 | |
| GB | 1225469 | | 3/1971 | |
| GB | 2575208 | B | 10/2022 | |
| JP | 55-38829 | | 3/1980 | |
| JP | H8-135593 | | 5/1996 | |
| JP | 2009261341 | | 11/2009 | |
| JP | 2011102574 | | 5/2011 | |
| JP | 2012-052287 | | 3/2012 | |
| KR | 100683571 | | 2/2007 | |
| NO | 20141502 | | 6/2016 | |
| SU | 1243660 | | 7/1986 | |
| WO | WO 1982/002645 | | 8/1982 | |
| WO | WO 2005/004593 | | 1/2005 | |
| WO | WO 2008/125332 | | 10/2008 | |
| WO | WO 2017/213511 | | 12/2017 | |
| WO | WO 2018/174723 | A1 | 9/2018 | |
| WO | WO-2019022612 | A3 * | 3/2019 | ............ A01K 79/00 |
| WO | WO 2019/135070 | | 7/2019 | |
| WO | WO 2020/080950 | | 4/2020 | |
| WO | WO 2020/103829 | | 5/2020 | |
| WO | WO 2020/104431 | | 5/2020 | |
| WO | WO-2020103829 | A1 * | 5/2020 | ............ A01K 3/02 |
| WO | WO 2021/012061 | | 1/2021 | |

OTHER PUBLICATIONS

Australian Examination Report No. 1 issued in corresponding Australian Patent Application No. 2018239113, dated Apr. 26, 2023 in 5 pages.

Canadian Office Action issued in the corresponding Canadian Patent Application No. 3057578, dated Oct. 20, 2023 in 3 pages.

Chinese Office Action issued for Chinese Patent Application No. 201880034149.8, dated Apr. 1, 2021 in 11 pages including English translation.

Communication pursuant to Article 94(3) EPC issued in the corresponding European Patent Application No. 18718245.6, dated Aug. 29, 2023 in 10 pages.

Examination Report issued for GB Patent Application No. GB1914705. 7, dated Feb. 9, 2022 in 2 pages.

International Search Report and Written Opinion for PCT Application No. PCT/No. 2018/0500086, dated Jun. 20, 2018 in 17 pages.

Norwegian Search Report for U.S. Appl. No. 20/170,485, dated Oct. 24, 2017 in 2 pages.

Office Action issued in CA 3,057,578 dated Mar. 3, 2026.

* cited by examiner

PUMPING SYSTEM AND METHOD

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

FIELD

The invention concerns the field of fluid transport by means of pumping, and in particular the transport of objects suspended by a liquid. The invention is useful for pumping such suspended objects as pellets, rocks, iron ore, foodstuffs, fish, krill and other aquatic biomass.

BACKGROUND

Krill are a type of zooplankton that live in the oceans and which are being harvested for commercial purposes. Because of their small size, krill need to be caught with trawls made of fine-meshed plankton nets. Trawling must be performed at low speeds due to high drag forces produced by the fine-meshed nets and in order to avoid clogging and damage to the krill and net.

Originally, the krill catch was brought on board the trawler by hoisting the trawl out of the water. This caused the krill to be compressed and thus losing a considerable part of its liquids, which was detrimental to the quality of the catch. Later developments in the technology included pumping the krill from the cod end of the net, through a large hose and onto the trawler. This method increases the capture capacity and the krill processing rate, and improves the quality of the catch as the krill residence time inside the trawl net is reduced.

The prior art includes WO 2008/125332 A2, which describes a trawling method and device by means of which the catch is transferred continuously from the trawl net to the trawling vessel during the trawling process. An open fish pump is disposed on the open end of the trawl net, the pump being directed toward the trawl net at the suction side, and the pressure side of which is connected to a delivery hose. The pump is operated by hydraulic oil or other hydraulic fluid supplied under pressure from the surface, or by an electric motor. The caught product guided toward the end of the trawl net during the trawling process is continuously pumped into the delivery hose as a caught product/water mixture during the trawling process, and transported on board the trawling vessel.

The prior art also includes FR 1 399 321 (Woborschil), which describes a trawl system having a hose between the trawl cod end and a pumping station, and a pressure duct extending between the pumping station and a surface vessel. The pumping station may be placed in the immediate vicinity of the trawl, preferably directly above, and trawl depth adjustment is accomplished by filling or exhausting the pumping station.

The prior art also includes U.S. Pat. No. 3,273,276 (Englesson), which describes a storage and transport device for live fish. The device comprises a trawl connected via a suction line to a floating pump device which is detachably coupled to a floating container.

The prior art also includes U.S. Pat. No. 6,343,433 (Granberg), which describes a method and an apparatus for separating target and non-target species harvested from waterbodies. A trawl net and a catch boat are each towable by a trawler by separate towing lines. A catch drawer is mounted within the catch boat for selective vertical movement relative thereto, and a conduit connects the cod end of the trawl net to a forward end of the catch drawer. The conduit permits aquatic organisms to be freely carried through the conduit along with a constant volume of water, which is funneled through the conduit as the trawl net is pulled through the waterbody. A pump maintains the surface level of water in the catch drawer below the surface level of the waterbody in which the catch boat is floating. As the trawl net and catch boat are towed through the waterbody, the constant upwelling of water from the trawl net through conduit delivers a supply of aquatic organisms to the catch drawer. In operation, the flow rate of the pump should match the upwelling water flow rate from conduit. Generally, the pump is only required to return by-catch organisms to the body of water.

The prior art also includes WO 2005/004593 A1, which describes a trawl equipped with an elongate, preferably rigid or flexible collecting cage which at an inlet opening is connected to the rear end of the trawl, and from the inlet opening extends into a second portion, defined by walls, roof and bottom which have openings for straining water, and is terminated in a downstream portion. A conveying hose or pipe for conveying biomass from the collecting cage up to a surface vessel opens into the downstream or aft portion of the cage via a funnel. Air or other fluid is supplied from the vessel via a supply hose for injection into the conveying hose or pipe in order, by injector effect, or air lift pump effect (in which the fluid is lifted when the injected air is expanding in the hose, to cause suction of the biomass from the collecting cage to the vessel.

The prior art also includes GB 1 172 179, which describes a pump assembly for the conveying of a fish-water mixture, comprising an entrance and an exit, a jet pipe arranged between said entrance and exit, a passage system leading from a first position between the downstream end of the jet pipe and said exit to a propellant water ring nozzle at a second position between the upstream end of the jet-pipe and said entrance, and a pump rotor in said passage system for pumping water around said system and forcing it through said propellant water ring nozzle.

The prior art also includes GB 1 225 469, which describes an apparatus for emptying a trawl net during trawling operations. The apparatus comprises a high-pressure water pump which draws water in through an opening and supplies water under pressure through an outlet to propel fish and water through an ejector and transport tube back to a collection point on board a trawler. A hydraulic motor may be used for the operation of the pump.

One disadvantage with the prior art is the need for large-diameter tubes and hoses for transferring the fish or biomass between the trawl and the surface vessel, as the pump is located near the trawl. Another disadvantage is the need for very long hoses, control and power lines and correspondingly large storage drums on the trawler, in view of the fact that the distance between the trawler and the trawl-and-pump assembly may be 600 to 800 meters or more.

The invention provides certain improvements over the prior art.

SUMMARY

The invention is set forth and characterized in the main claim, while the dependent claims describe other characteristics of the invention.

It is thus provided a pumping system for moving a liquid, or a mixture of a liquid and one or more objects, comprising a surface vessel or structure, a pump unit, and a collector device, and a first delivery line connected between the collector device and the pump unit and a second delivery line connected between the pump unit and the surface vessel or structure;

wherein the pump unit is operable for moving said liquid, or mixture of a liquid and one or more objects from the collector device to a receiving facility arranged on the surface vessel or structure;

wherein the pump unit is supported and controlled by the surface vessel or structure via a first support-and-control apparatus and operable to be arranged at a first depth below a surface of a body of water, between the collector device and the surface vessel or structure;

wherein the collector device is operable to be arranged at a second depth below said a surface of a body of water;

wherein the pump unit is configured to generate suction in the first delivery line and a positive pressure in the second delivery line;

wherein the first depth and the second depth are controllable independently of each other.

In one embodiment, the collector device is operable to be arranged in the body of water and/or on a seabed below the body of water, and supported and controlled by the surface vessel or structure via a second support-and-control apparatus.

In one embodiment, the first support-and-control apparatus comprises a towing wire connected between the pump unit and the surface vessel or structure.

In one embodiment, the first support-and-control apparatus comprises a carrier arm or a lifting wire connected between the pump unit and the surface vessel or structure.

In one embodiment, the pump unit is connected to outriggers on the surface vessel or structure or to telescopic arms or other structures that allow the pump unit to be lowered below the water surface.

In one embodiment, the pump unit is arranged in a tank inside the surface vessel or structure, and the tank is open to the surrounding sea below the surface vessel or structure.

In one embodiment, the collector device is a trawl and the second support-and-control apparatus is a trawl wire.

In one embodiment, the pump unit comprises a pump which is selected from the group consisting of: centrifugal pump, positive displacement pump, or any pump which imparts mechanical energy to said liquid.

In one embodiment, the receiving facility is arranged at a height above the water surface.

In one embodiment, the pumping system comprises a valve fluidly connected to the first delivery line at an inlet in the vicinity of the pump unit and operable to allow an inflow of ambient seawater into the first delivery line. The valve may be a check valve.

In one embodiment, the valve is manually or automatically operated, or set to open and close at one or more predetermined pressures. The valve may be an adjustable valve.

In one embodiment, the pump unit comprises a housing shaped to reduce hydrodynamic drag.

In one embodiment, the pump unit comprises one or more weights. In one embodiment, the pump unit comprises a depth rudder configured and operable to imparting a downward force to the pump unit.

In one embodiment, the collector is a collector configured for being at rest on a seabed.

The liquid is preferably seawater and the objects are selected from the group consisting of fish, krill or other biomass, scallop, rock, pieces of iron ore.

The invented pumping system may thus be used as a vacuum pump system to deliver said liquid or mixture to said receiving facility. This is achieved by lowering the pump unit only to a water depth necessary to obtain sufficient pressure at the pump inlet in order to avoid pump cavitation when drawing (by suction) water through the first delivery line (vacuum line). This necessary water depth will depend on (i.a) the length of the first delivery line. For example, it trawling is performed at the sea level (surface), a typical length for the first delivery line is on the order of 150 meters, and the pressure drop through this line will be much less than if the trawling is performed at greater depths (and thus requiring greater length for the first delivery line).

It is also provided a method of operating the pumping system according to the invention, characterized by a) determining, estimating or sensing the pressure drop in the first delivery line; and b) arranging the pump unit at a depth that provides a pump inlet pressure which is sufficient for avoiding cavitation in a pump in the pump unit.

It is also provided a method operating the pumping system according to the invention, characterized by a) determining, estimating or sensing the pressure drop in the first delivery line; and b) operating the adjustable valve to adjust the inlet pressure into the pump to avoid cavitation in the pump in the pump unit.

The pressure drop in the first delivery line may be determined or estimated based on the length, internal diameter and internal surface properties of the first delivery line.

With the invention, in which the pump unit is submerged, it is possible to arrange the pump unit close to the vessel, or connected to it, which result in several operational advantages, such as shorter control cables and power cables, easier maintenance.

The prior art, which to a large extent relies on the infusion or injection of an additional fluid (e.g. water or air) from the surface, and in effect are venturi-driven injector pumps or air-lift pumps, require comparably large-diameter delivery lines. By contrast, the invention only uses the medium which is being pumped and is not dependent on any such externally-supplied fluids. The submerged pump unit makes it possible to reduce the delivery line diameter considerably compared to the prior art, to e.g. 8 to 10 inches (20.3 to 25.4 cm). By lowering the pump unit deeper into the body of water, the first delivery line may tolerate a greater vacuum.

The invented system, in which the pump (e.g. a centrifugal pump or a positive displacement pump) is submerged into the body of water, is in effect a vacuum pump system which is capable of delivering fluids to levels well above the water surface.

With the invented system, the need for long hoses and cables for the pump, and correspondingly large storage drums on the trawler, has been mitigated.

BRIEF DESCRIPTION OF THE DRAWINGS

These and other characteristics of the invention will become clear from the following description of a preferential form of embodiment, given as a non-restrictive example, with reference to the attached drawings, wherein.

DETAILED DESCRIPTION

Figure 1:
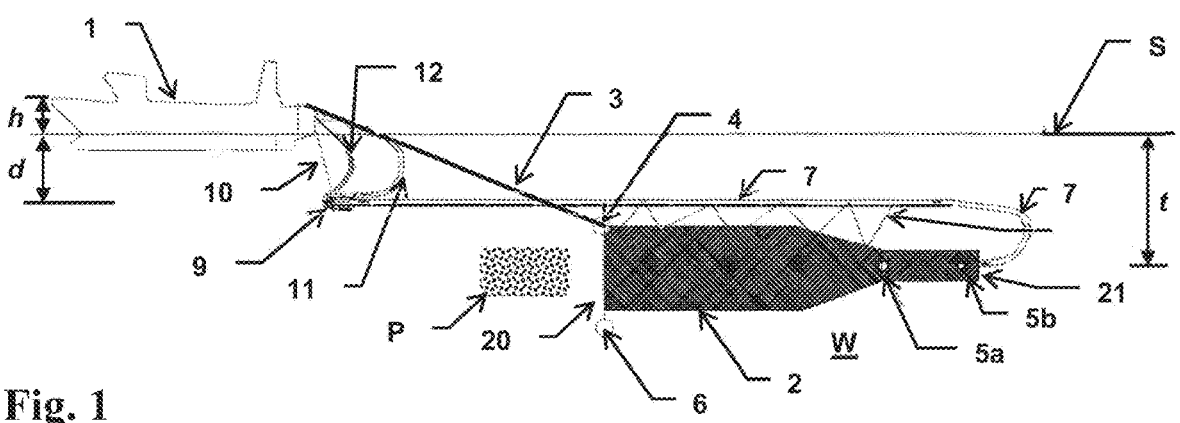
FIG. 1 is a schematic side view of a trawler towing a trawl in a body of water, and an embodiment of the invented pumping system.

The following description will use terms such as "horizontal", "vertical", "lateral", "back and forth", "up and down", "upper", "lower", "inner", "outer", "forward", "rear", etc. These terms generally refer to the views and orientations as shown in the drawings and that are associated with a normal use of the invention. The terms are used for the reader's convenience only and shall not be limiting.

FIG. 1 illustrates a trawler 1 towing a trawl 2 in a body of water W (e.g. the sea) by means of a trawl wire 3. The trawl wire is connected to the open trawl end 20 via a connection member, such as a boom 4 or otter board. The trawl comprises a net as is known in the art, and flow sensors 5*a*, 5*b* are arranged towards the cod end 21. One or more weights 6 are connected to the open end 20, in a manner well known in the art. The reference letter P designates the biomass which is to be caught by the trawl, the biomass being for example fish or krill.

Arranged in the vicinity of (here: immediately behind) the trawler 1 and at a first vertical distance (i.e. water depth) d below the water surface S, a pump unit 9 is arranged. In the illustrated embodiment, the pump unit 9 is connected to, and towed behind, the trawler 1 via a towing wire 10. An umbilical 12, comprising hydraulic lines and other required power, control and signaling lines, as required, is connected between power, control, support and utility systems (not shown) on the trawler and the pump unit. The trawl 2 is being towed at a second vertical distance (i.e. water depth) t below the water surface S, and this second vertical distance t may range between near water surface level and several hundred meters below. The trawl 2 depth (1) and the pump unit 9 depth (d) are thus controlled independently of each other, and the trawl may be moved up and down in the water as required for the intended purpose while the pump unit position does not have to be changed. The dynamic system comprising the pump unit and the trawler can therefore be controlled independently of the dynamic system comprising the trawl, and vice versa.

Extending between the cod end (i.e. rear, narrow, end) 21 of the trawl and the pump unit 9 is a first delivery hose 7.

Reference number 8 indicates means (stitching, etc.) by which a portion of the first delivery hose may be connected into, or partly embedded into, the trawl 2. Extending between the pump unit 9 and the trawler 1 is a second delivery hose 11. On the trawler, the second delivery hose 11 may terminate into a cargo hold or a processing facility (not shown in FIG. 1).

Figure 2:
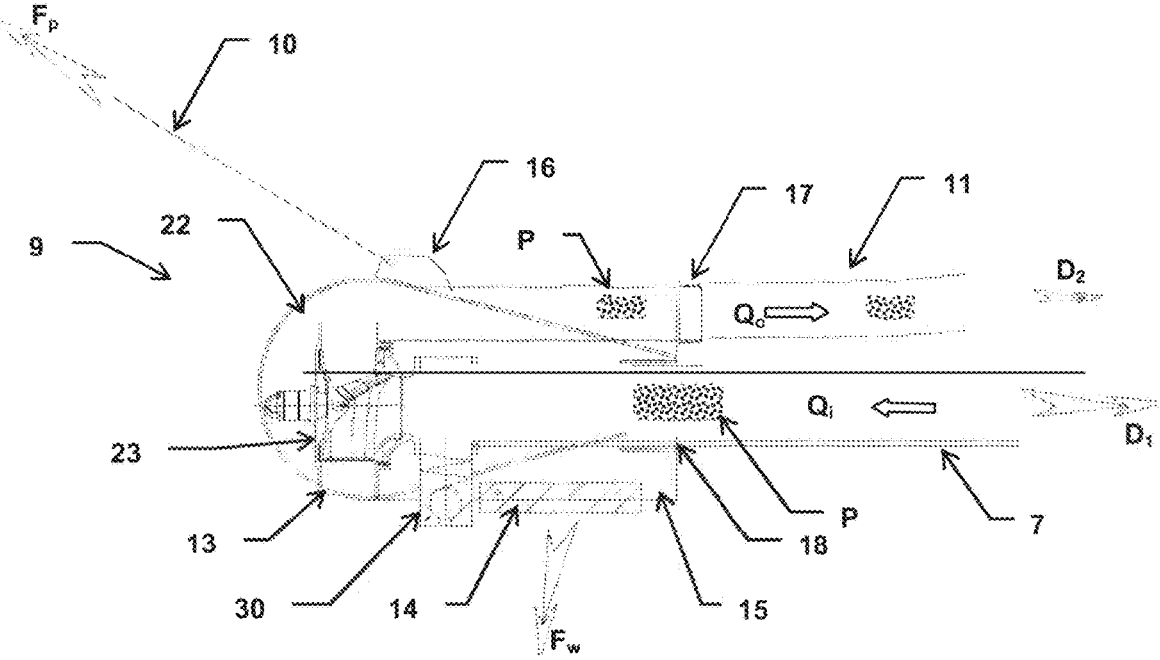
FIG. 2 is a schematic sectional side view of an embodiment of the pump unit illustrated in FIG. 1.

Turning now to FIG. 2, the pump unit 9 comprises a housing 13 which in the illustrated embodiment is bulb-shaped in order to lower the hydrodynamic drag when the pump unit is pulled through the water.

Inside the housing 13 is a centrifugal pump 22 which comprises an impeller 23 driven by an internal motor (not shown in FIG. 2), preferably hydraulically driven and controlled via the umbilical 12 (see FIG. 1; not shown in FIG. 2). It should be understood that the motor may also be an electric motor. As impeller-and-motor configurations are well known in the art, they need not be described in detail here. It should be understood that the pump may also be a positive displacement pump.

In use, the pump 22 generates a partial vacuum, and hence suction, in the first delivery hose 7, and an overpressure (discharge pressure) in the second delivery hose 11. Thus, the first delivery hose 7 is connected to a suction end (inlet) 18 of the pump unit, and the second delivery hose 11 is connected to a discharge end (outlet) 17 of the pump unit. The pump also comprises a check valve 30, fluidly connected to the suction side of the impeller, i.e. in fluid communication with the first delivery hose 7 and the pump inlet 18.

FIG. 2 illustrates how a fluid inflow $Q_i$ flows into the pump through the first delivery hose 7, carrying with it krill P, and how a fluid outflow $Q_o$ flows out of the pump through the second delivery hose 11, delivering the krill P to the trawler (see FIG. 1; not shown in FIG. 2).

It should be understood that the first delivery hose 7 must be able to withstand suction (negative pressure) without collapsing, and may to that end be furnished with spiral reinforcement strings, or similar. The second delivery hose 11 does however not need to have such capabilities, as it is being subjected to only positive pressures, but may be designed to withstand high positive pressures and external forces, such as wave action in the splash zone and abrasion caused by the vessel hull. As a non-limiting example, the first delivery hose 7 may be a vacuum hose of 600 metres length and an internal diameter of 8 to 10 inches (20.3 to 25.4 cm) and capable of withstanding a vacuum of 3 bar (i.e. negative pressure). The second delivery hose 11 may be a pressure hose of approximately 60 metres length and an internal diameter of 8 to 10 inches (20.3 to 25.4 cm).

In a practical application, the horizontal distance between the trawler and the open end 20 of the trawl may typically be between approximately 100 and 600 meters. Also, for example when trawling for krill, the trawl depth (second vertical distance) t may typically range between zero (sea level) and 300 meters below the water surface S, and the first vertical distance d below the water surface at which the pump unit 9 is arranged may be 10 to 30 meters. In another example, trawl depth t is approximately 2000 meters and pump unit depth d is approximately 50 meters. Typical lifting height h above the water surface (see FIG. 1) may be 5 to 10 meters. The invention shall not be limited to these numerical values, but by arranging the pump unit in the water near the trawler and operating it independently of the trawl, a greater pressure drop in the first delivery hose can be tolerated compared to the prior art systems. This is because the pump unit need only be lowered to the depth necessary to avoid cavitation in the pump. Also, the check valve 30 may be controlled (e.g. remotely) in order to avoid cavitation. It should therefore be understood that the check valve 30 may be operated by or be replaced by a relief valve. Operating the check valve (relief valve) causes less flow in the first delivery hose 7 (i.e. the vacuum hose) because a controlled water flow is allowed through the valve.

As mentioned above, the pump unit housing 13 is shaped so as to minimize hydrodynamic drag. In addition, in order for the pump unit 9 to move in a steady and predictable manner in the water, the housing is fitted with stabilizer fins, in the illustrated embodiment a ventral fin 15 and a dorsal fin 16. It will be appreciated that other fin configurations may be advantageous. In order to further augment the hydrodynamic properties of the pump unit 9, one or more clump weights 14 may be attached to the pump housing. Although FIG. 2 shows only one clump weight, it should be understood that weight may be added to the pump unit in a number of ways.

In a non-limiting example, the clump weight 14 may generate a downward force $F_w$ of 3 tonnes. The pulling force $F_p$ in the towing wire 10 is 5.8 tonnes, the drag $D_1$ produced by the trawl and first deliver hose is 4 tonnes and the drag $D_2$ produced by the second delivery hose is 1 tonne.

Figure 3:
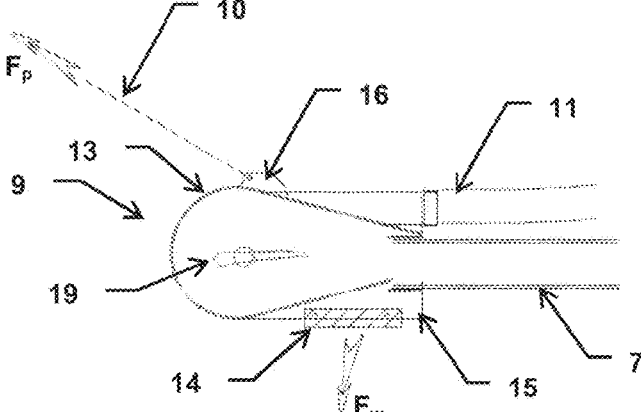
FIG. 3 is a schematic side view of another embodiment of the pump unit.

As it may be desirable to lower the weight of the pump unit, for example when lifting the pump unit in and out of the sea, it may be desirable to remove the clump weight 14 or lower its mass. This may be achieved with the embodiment illustrated in FIG. 3. Here, a depth rudder 19 is fitted to the pump unit. The depth rudder may be powered via hydraulics or electricity, for example via the umbilical mentioned above, in a manner which per se is well known in the art. The depth rudder may be operated to generate a downward force that reduces or removes the dependence on the clump weight.

Although the pump unit 9 has been described above as being towed by a towing wire, the invention shall not be limited to this connection means, as it should be understood that the pump unit may be connected to the trawler in a number of ways. For example, the pump unit may be connected to outriggers on the trawler, or to telescopic arms or other structures that allow the pump unit to be lowered below the water surface. It is also conceivable that the pump unit 9 may be arranged in a tank or (not shown) or moon pool inside the trawler, and the tank is open to the surrounding sea below the trawler. The pump unit would in that case be arranged in the tank or moon pool and be lowered to the first vertical distance (depth) d below the water surface S, in order to achieve the necessary pressure at the pump inlet 18 to avoid cavitation when the mixture of water and biomass is transported through the first delivery hose 7 (vacuum hose) and the trawl outlet.

Figure 4A:
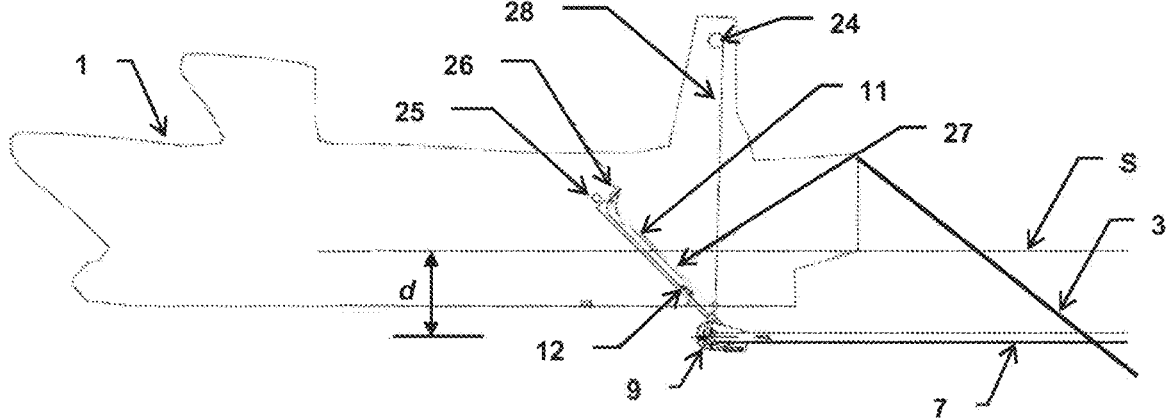
FIGS. 4*a* and 4*b* are schematic and partial sectional side views of an alternative embodiment for suspending and operating the pump unit, in operating (extended) and inactive (retracted) positions, respectively.
Figure 4B:
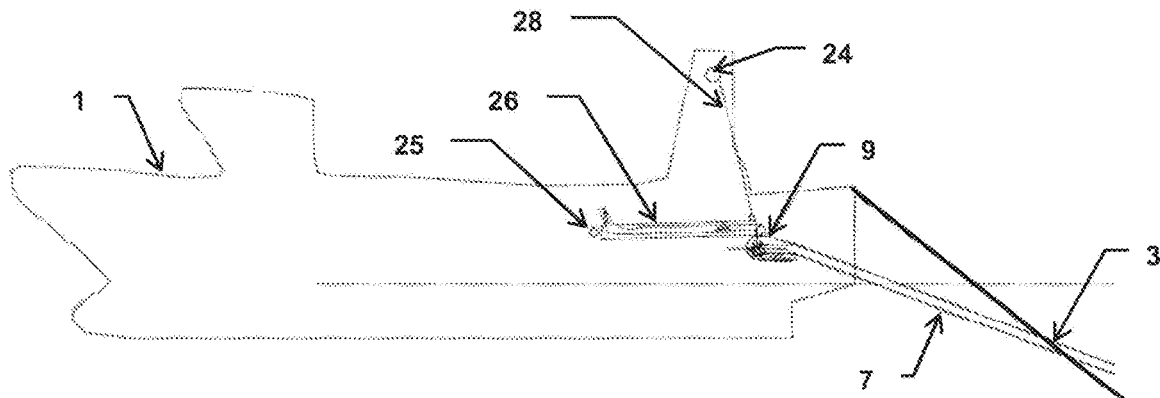

FIGS. 4a and 4b show one such alternative connection means. Here, the pump unit 9 is connected to a carrier arm 27 which is pivotally supported by an axle or other pivot member 25. A lifting wire 28 extends between the pump unit (or a lower portion of the carrier arm) and an overhead winch 24. The second delivery hose 11 (positive pressure) and umbilical 12 are arranged along the carrier arm, reference number 26 indicates the second delivery hose opening. Thus, by operating the winch 24, the pump unit may be operated between an extended position (FIG. 4a, operating state) below the trawler, and a retracted position (FIG. 4b, inactive state).

Figure 5A:
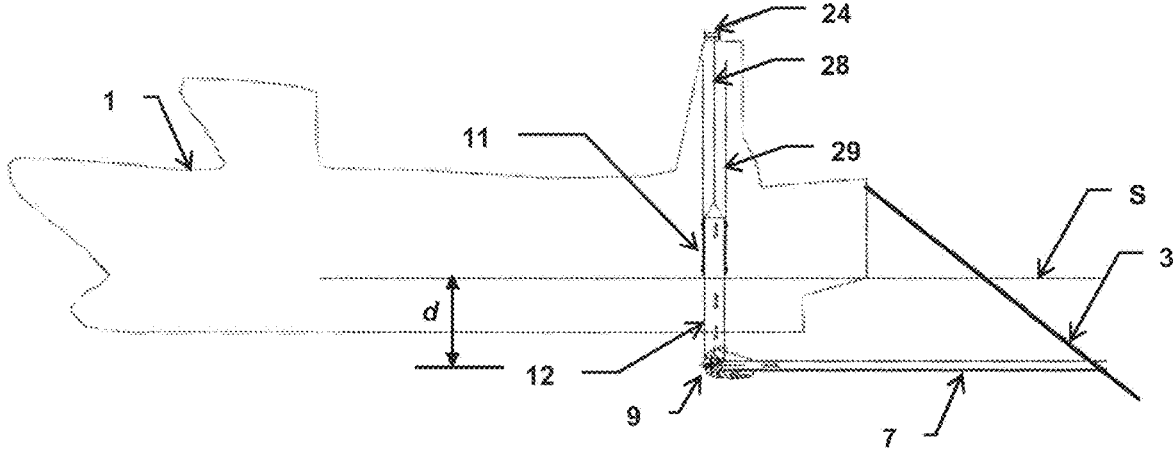
FIGS. 5*a* and 5*b* are schematic and partial sectional side views of yet an alternative embodiment for suspending and operating the pump unit, in operating (extended) and inactive (retracted) positions, respectively.
Figure 5B:
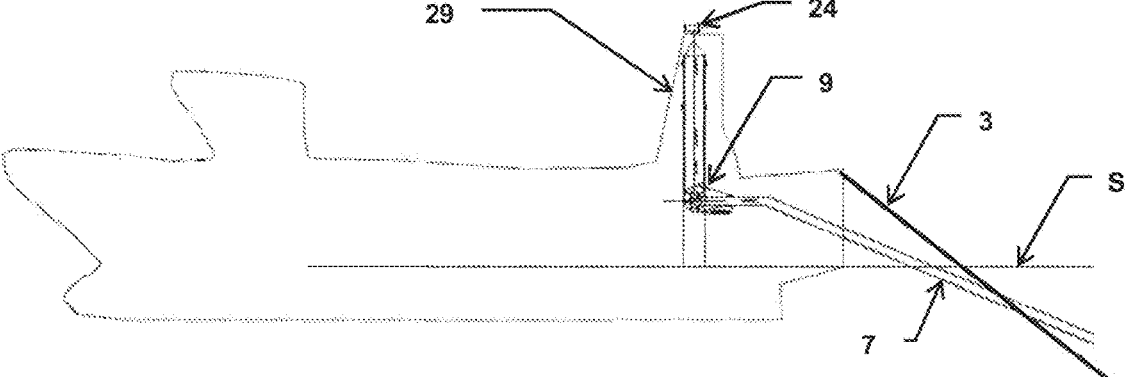

FIGS. 5a and 5b show another such alternative connection means. Here, the pump unit 9 is connected to a lifting wire 28 which runs through a guide structure 29. Arranged at the top of the guide structure 29 is a winch 24, and the lower part of the guide structure is open towards the sea, through the trawler hull. The second delivery hose 11 (positive pressure) and umbilical 12 are arranged along the guide structure. Thus, by operating the winch 24, the pump unit may be operated between an extended position (FIG. 5a, operating state) below the trawler and a retracted position (FIG. 5b, inactive state).

Figures 6, 7:
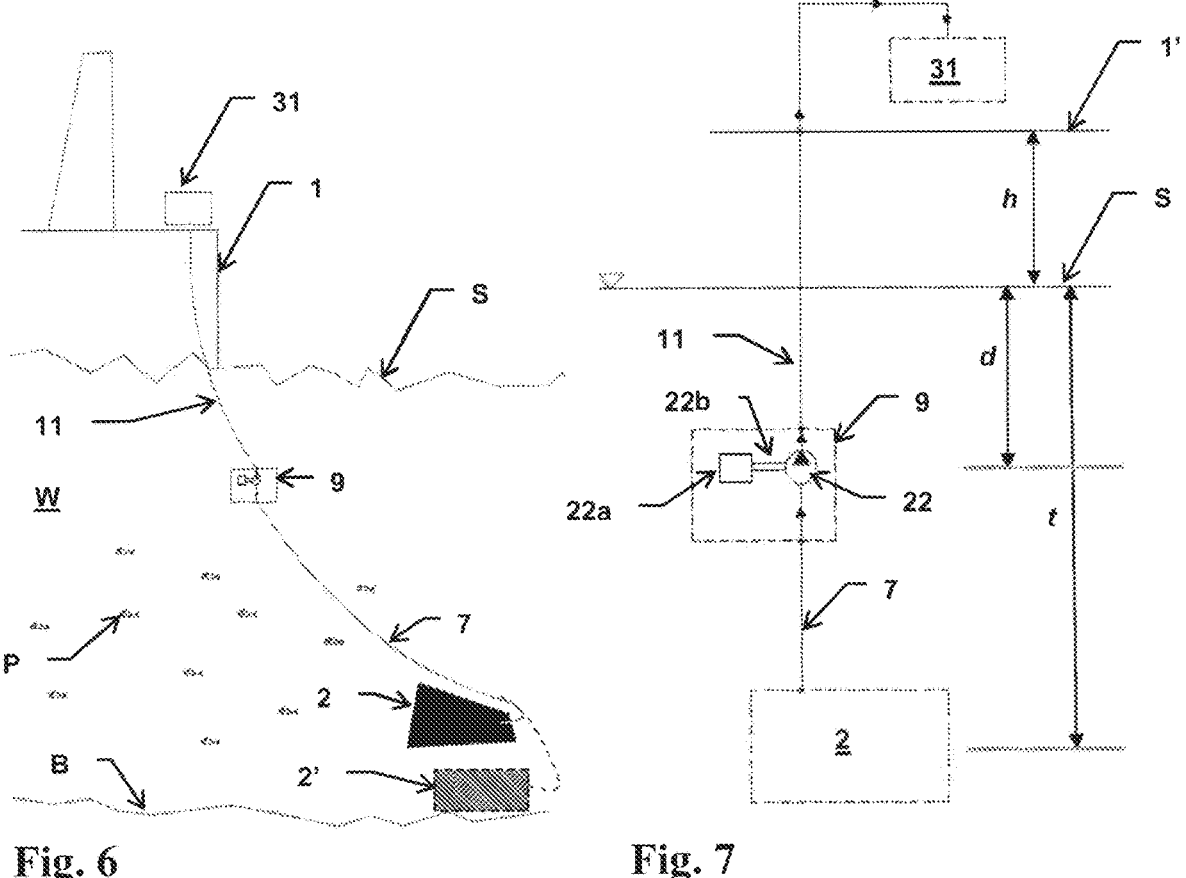
FIG. 6 is a schematic sketch of an embodiment of the invented pumping system.
FIG. 7 is a schematic diagram of the embodiment of the pumping system illustrated in FIG. 6.

FIG. 6 is a schematic illustration of certain parts of the system illustrated in FIG. 1 (certain features, e.g. towing means, have been omitted). The trawl 2 is shown as being suspended in the body of water W, above the seabed B, structurally decoupled from the pump unit. It should be understood that the invention is equally applicable to situations and configurations in which the trawl is moving in the water, at rest in the water, moving along a seabed B, or being stationary on a seabed B. This is indicated in FIG. 6 by reference number 2' and the dotted lines illustrating a seabed collector. Also, while the description above refers to a trawl 2 for fish or other biomass P, it should be understood that the trawl may be replaced by any suitable collector designed for collecting any objects suspended in water, and for feeding a mixture of water and such objects into the first delivery hose 7. Therefore, the trawl 2 will in some instances in the following simply be referred to as a "collector" 2. In addition to fish, krill and other biomass, objects P may be rocks, gravel, iron ore, scallop, etc., and the skilled person will understand that the collector 2 will have to be designed for its specific intended catch. For example, if the intended catch are objects resting on the seabed, the collector may be furnished with a device (e.g. a mechanical shovel) configured to throw the objects up from the seabed immediately in front of the first delivery hose inlet.

Consequently, the above-mentioned trawler 1 may in fact be any boat, vessel or structure above the water surface, and the processing plant 31 is designed for processing the applicable catch (mixture of objects P and water). FIG. 6 therefore illustrates a collector 2 arranged in a body of water (or 2' on the seabed), fluidly connected by a first delivery hose 7 to a submerged pump unit 9 remote from the collector, and the pump unit 9 being fluidly connected by means of a second delivery hose 11 to a processing plant 31 on a vessel 1. As mentioned above, the first delivery hose 7 is able to withstand suction without collapsing.

While in a practical application, the mixture of objects P and water is transported from the collector 2 to the processing plant 31 by means of flexible hoses 7, 11, the invention shall not be limited to such conduits. In general, any known fluid conduit may be used. Therefore, the first and second hoses will in the following also be referred to as first and second delivery lines 7, 11.

FIG. 7 is essentially a schematic diagram of the pumping system illustrated in FIG. 6. Reference number 1' denotes a deck (of e.g. a vessel) or platform a distance h above the water surface S. The pump unit 9 comprises a pump 22 driven by a motor 22a via a shaft 22b. The motor 22a may be an electric motor, a hydraulic motor or any other suitable motor known in the art. The motor 22a is arranged inside its own housing, sealed from the pump 22 and hence the pumped medium. The only connection between the pump motor 22a and the pump 22 is via the shaft 22b, which is also extending through seals (not shown). This separation of motor and pump is particularly advantageous in an embodiment in which the motor is utilizing hydraulic fluids (oils): a leakage will not compromise the pumped medium (fish and water). The pump motor 22a may be connected to the shaft 22b via a spline connection, whereby the motor may be removed or exchanged without having to disconnect the pump 22 from the delivery lines.

The pump unit 9 is arranged in the water at a first vertical distance (depth) d below the water surface, and the collector 2 (or 2') is arranged at a second vertical distance t below the water surface. Although not illustrated in FIGS. 6 and 7, the horizontal distance between the collector 2 and the deck 1' may be several hundred metres.

The pump 22, which may be a centrifugal pump or a positive displacement pump, generates a partial vacuum, and hence suction, in the first delivery line 7, and an overpressure (discharge pressure) in the second delivery line 11. As mentioned above with reference to FIG. 2, the first delivery line (delivery hose) 7 must be able to withstand suction without collapsing, and may to that end be furnished with spiral reinforcement strings, or similar. The second delivery line (delivery hose) 11 does however not need to have such capabilities, as it is being subjected to only positive pressures.

As a practical and non-limiting example, if the length of the first delivery line 7 may be 600 metres, the diameter of this line (suction hose) is 8 inches (20.3 cm), and the flow rate is 400 tonnes/hour, a pressure drop of approximately 1.8 bar is generated in the first delivery line 7 (i.e. from the collector 2 to the pump 22). If the pump unit 9 (and pump 22) is arranged at a depth d=30 metres (i.e. at 4 bar pressure), the pump will have a pressure margin of 2.2 bar before cavitation occurs in the pump. If the deck 1' is arranged a height above the water surface of approximately h=6 metres, approximately 0.6 bar is required to lift the contents of the delivery lines (water and objects P) from the water and onto the deck. Hence, there is still ample margin before cavitation occurs (By contrast, should the submerged pump be replaced that a vacuum pump on deck, which is known in the prior art, the required vacuum would be 2.4 bar, which would result in cavitation).

Based on the above, it will be understood that lowering the pump to even further depths (d), the margin with respect to pump cavitation will increase. Also, if the length of the first delivery line 7 is shorter (say 150 meters), the pressure drop in the first delivery line 7 is reduced proportionally (to say 0.45 bar) and the depth d requirement decreases correspondingly. Such shorter delivery lines are applicable when trawling for fish in shallower depths.

It should thus be understood that submerging the pump into the body of water as described above, in effect generates a vacuum pump system which is capable of delivering fluids to levels well above the water surface.

A basic principle of the invention is to lower the pump unit 9 to a first depth d which is sufficient for avoiding cavitation. Thus the required depth d may be determined based on the pressure drop in the first delivery line 7 (including the collector 2).

Figure 8:
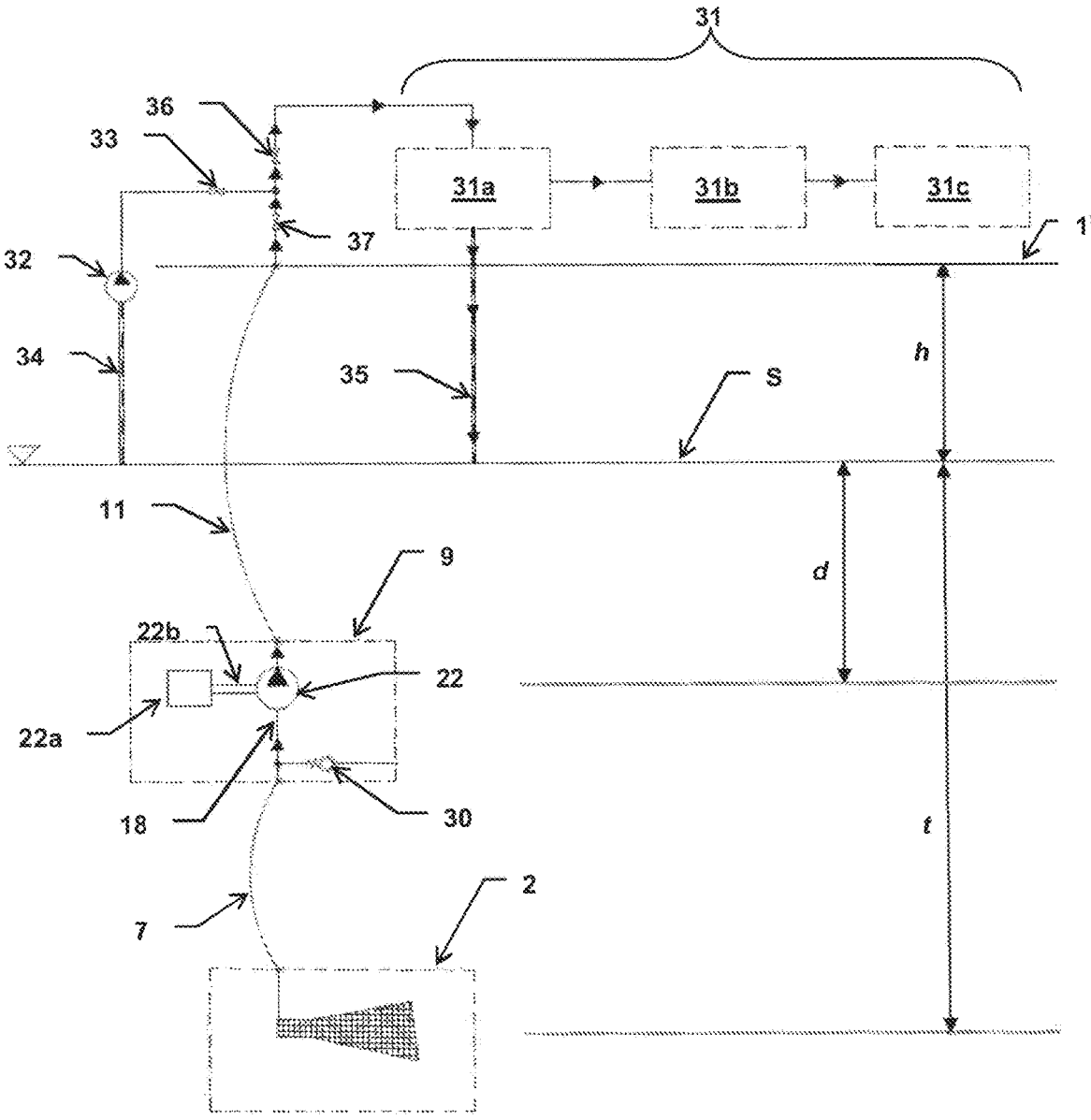
FIG. 8 is a schematic diagram of an embodiment of the invented pumping system, illustrating a normal operation.

Referring now to FIG. 8, an inlet valve 37 and a gate valve 36 are arranged in the second delivery line 11, and the delivery line is connected consecutively to a water separator 31a, a storage tank 31b and a processing facility 31c. The skilled person will know that these components may be designed, configured and dimensioned for the applicable catch (i.e. nature of objects P), and that the processing plant 31 in fact may be any receiving facility. A water discharge pipe 35 is configured for returning water to the sea. A flushing pump 32 is configured to feed water into the second line 11, between the inlet valve 37 and the gate valve 36, via a pipe 34, and a shut-off valve 33 is arranged between the flushing pump 32 and the second line 11. The flushing pump 32 is typically arranged on the vessel and configured to deliver a flow of between 500 and 1000 tonnes/hour at approximately 3 bar.

Fluidly connected to the first line 7, hence on inlet side of the pump 22, and arranged in the pump unit 9, is a check valve 30. The check valve 30 is preset or operated to prevent a collapse of the first line 7, and will as such serve as a safety valve for the system. A typical opening pressure for the check valve is 2 bar, but this pressure may be set according to the applicable requirements. In addition to performing the safety valve function, the check valve may be operated (manually or automatically, e.g. based on sensor inputs) to control the mixture of seawater and fish passing through the pump, and thus in fact serve as a mixing valve. If it is desirable to increase the water flow, the valve may be opened fully or partially for a desired period of time.

FIG. 8 shows a situation in which the system is operating, i.e. feeding a mixture of water and objects P from the collector 2 to the processing plant 31. The shut-off valve 33 is closed and the flushing pump 32 is off. Inlet valve 37 and gate valve 36 are open. The pump 22 is operating and the check valve 30 is closed, such that no seawater passes through the valve 30. In this state, the system is operating within acceptable tolerances for avoiding cavitation. The valve 30 may be designed to open or close at predetermined pressures, or may be remotely operated.

Figure 9:
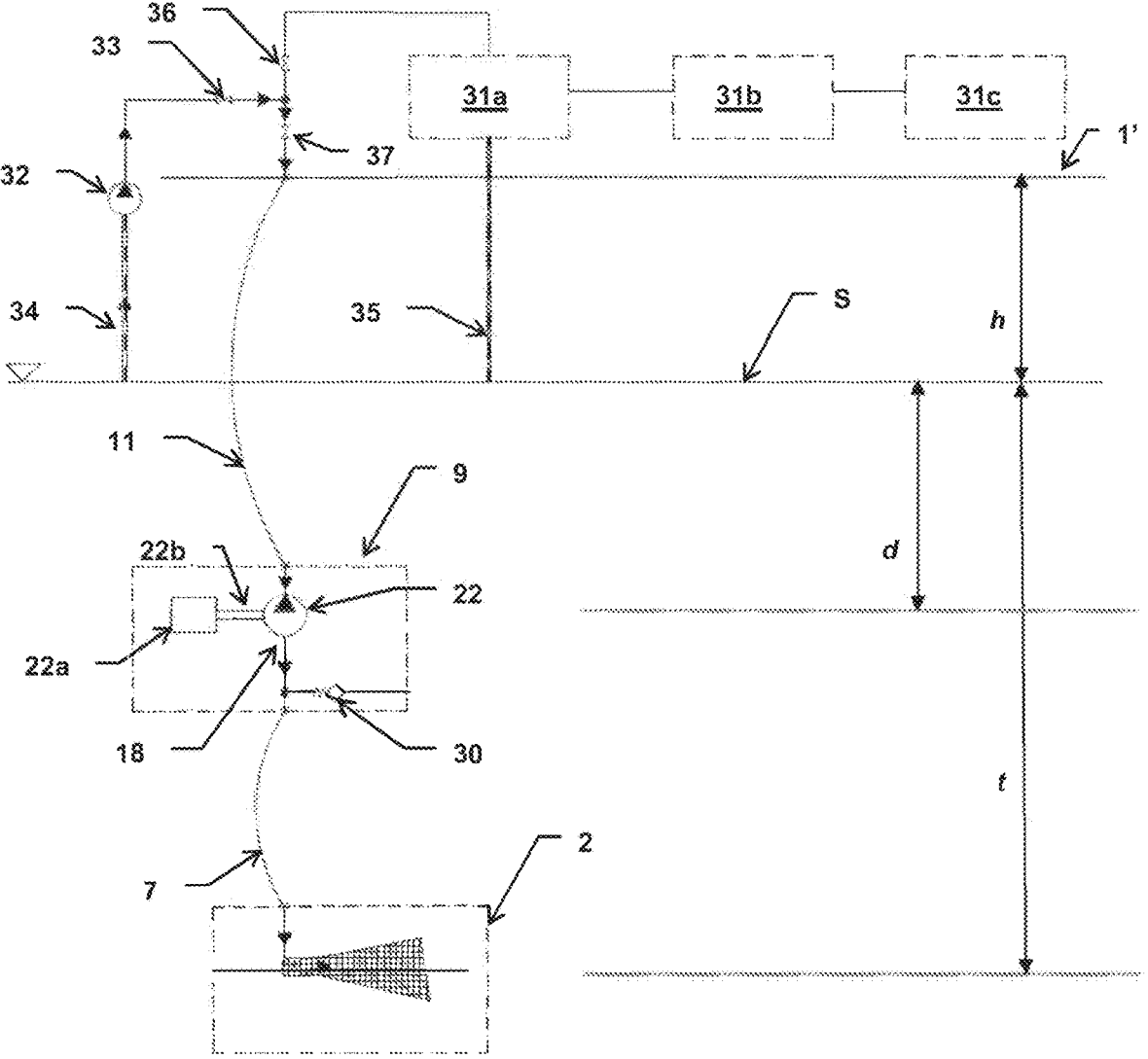
FIG. 9 is a schematic diagram of an embodiment of the invented pumping system corresponding to FIG. 8, illustrating a hose cleaning procedure.

During operation (e.g. trawling), the first delivery line 7 or the trawl outlet may become clogged by aggregation of objects P or by debris or other unwanted objects. The invented system makes it possible to resolve this problem without having to take the pumps and lines out of the water. FIG. 9 illustrates such cleaning procedure to remove obstacles from the delivery lines. In this configuration, the submerged pump 22 is not operating and the gate valve 36 is closed. The inlet valve 37 and the shut-off valve 32 are open and the flushing pump 32 is running. Therefore, the seawater is pumped by the flushing pump 32, through the pipe 34, down into the second line 11, through the inactive pump 22 and into the first delivery line 7, thereby flushing the first delivery line and the trawl outlet back into the trawl.

Figure 10:
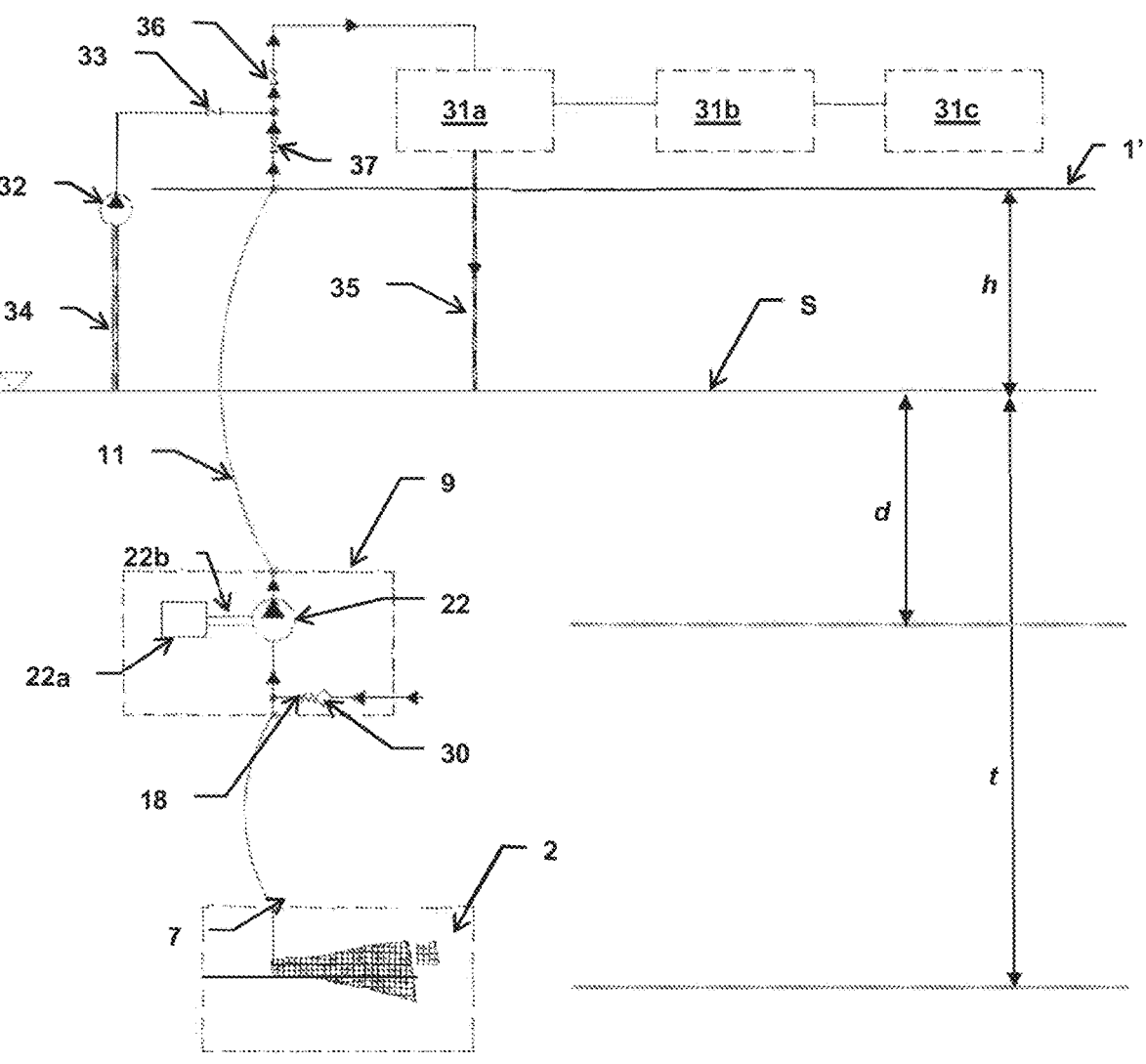
FIG. 10 is a schematic diagram of an embodiment of the invented pumping system corresponding to FIGS. 8 and 9, illustrating a state in which a pump check valve or remotely controlled relief valve is activated.

FIG. 10 illustrates the safety feature inherent in the check valve 30. The shut-off valve 33 is closed and the flushing pump 32 is off, and inlet valve 37 and gate valve 36 are open, as is the case during normal operation. In the case of a blockage occurring in the first line 7 or at the inlet in the collector 2, causing the vacuum in the first line to exceed the check valve 30 opening pressure, the check valve will open. In a practical application, sensors and control systems (not shown) will shut off the submerged pump 22. Then, the blockage may be removed by the procedure described above with reference to FIG. 9.

Although the invented system has been described above with the pump unit 9 being connected to the trawler (via a wire, carrier arm or similar), the invention shall not be limited to such physical connection. It should be understood that the invention is equally applicable to a system in which the pump unit is arranged in front of the trawl (collector), i.e. in the direction towards the trawler, and a second delivery line is connected between the pump unit and the collector.

Although the invention has been described with reference to a centrifugal pump, it should be understood that the invention is equally applicable to centrifugal pumps and positive displacement pumps and other pumps which imparts mechanical energy to the seawater which is being pumped.

What is claimed is:

1. A pumping system for moving a liquid, or a mixture of a liquid and one or more objects, comprising a surface vessel or structure, a pump unit, and a collector device, and a first delivery line connected between the collector device and the pump unit and a second delivery line connected between the pump unit and the surface vessel or structure;

wherein the pump unit is operable for moving said liquid, or mixture of a liquid and one or more objects, from the collector device to a receiving facility arranged on the surface vessel or structure;

wherein the pump unit is supported and controlled by the surface vessel or structure via a first support-and-control apparatus and operable to be arranged at a first depth below a surface of a body of water, between the collector device and the surface vessel or structure;

wherein the collector device is operable to be arranged at a second depth below said a surface of a body of water;

wherein the pump unit is configured to generate suction in the first delivery line and a positive pressure in the second delivery line;

wherein the first depth and the second depth are controllable independently of each other.

2. The pumping system of claim 1, wherein the collector device is operable to be arranged in the body of water and/or on a seabed below the body of water, and supported and controlled by the surface vessel or structure via a second support-and-control apparatus.

3. The pumping system of claim 1, wherein the first support-and-control apparatus comprises a towing wire connected between the pump unit and the surface vessel or structure.

4. The pumping system of claim 1, wherein the first support-and-control apparatus comprises a carrier arm or a lifting wire connected between the pump unit and the surface vessel or structure.

5. The pumping system of claim 1, wherein the pump unit is connected to outriggers on the surface vessel or structure or to telescopic arms or other structures that allow the pump unit to be lowered below the water surface.

6. The pumping system of claim 1, wherein the pump unit is arranged in a tank inside the surface vessel or structure, and the tank is open to the surrounding sea below the surface vessel or structure.

7. The pumping system of claim 2, wherein the collector device is a trawl and the second support-and-control apparatus is a trawl wire.

8. The pumping system of claim 1, wherein the pump unit comprises a pump selected from the group consisting of a centrifugal pump, a positive displacement pump, and any pump which imparts mechanical energy to said liquid.

9. The pumping system of claim 1, wherein the receiving facility is arranged at a height above the water surface.

10. The pumping system of claim 1, further comprising a valve fluidly connected to the first delivery line at an inlet in the vicinity of the pump unit and operable to allow an inflow of ambient seawater into the first delivery line.

11. The pumping system of claim 10, wherein the valve is a check valve.

12. The pumping system of claim 10, wherein the valve is manually or automatically operated, or set to open and close at one or more predetermined pressures.

13. The pumping system of claim 12, wherein the valve is an adjustable valve.

14. The pumping system of claim 1, wherein the pump unit comprises a housing shaped to reduce hydrodynamic drag.

15. The pumping system of claim 1, wherein the pump unit comprises one or more weights.

16. The pumping system of claim 1, wherein the pump unit further comprises a depth rudder configured and operable to imparting a downward force to the pump unit.

17. The pumping system of claim 1, wherein the collector is a collector configured for being at rest on a seabed.

18. The pumping system of claim 1, wherein the liquid is seawater and the objects are selected from the group consisting of fish, krill or other biomass, scallop, rock, pieces of iron ore.

19. A method of operating the pumping system of claim 1, comprising:

a) determining, estimating or sensing the pressure drop in the first delivery line; and b) arranging the pump unit at a first depth that provides a pump inlet pressure which is sufficient for avoiding cavitation in a pump in the pump unit.

20. A method of operating the pumping system of claim 1, comprising:

a) determining, estimating or sensing the pressure drop in the first delivery line; and b) operating an adjustable valve to adjust the inlet pressure into a pump in the pump unit to avoid cavitation in the pump.

* * * * *